ND
2,773,080
Δ⁴-PREGNENES

Seymour Bernstein, Pearl River, N. Y., and Robert Herman Lenhard, Ridgefield Park, N. J., assignors to American Cyanamid Company, New York, N. Y., a corporation of Maine No Drawing. Application June 30, 1955,
Serial No. 519,249
6 Claims. (Cl. 260—397.45)

This invention relates to new steroid compounds. More particularly, it relates to 9α-halo-16α-hydroxy-hydrocortisone, esters thereof and methods of preparing the same.

It has been known that 9α-fluoro-hydrocortisone is more active than hydrocortisone; Fried et al.; J. Am. Chem. Soc. 75 2273 (1953), and 76 1455 (1954). However, 9α-fluoro-hydrocortisone has such a high electrolyte activity (sodium retention) that it can be used only topically and not systemically, L. E. Ward et al., Proc. Mayo Clinic, 29 649 (1954). We have now found that 9α-halo-16α-hydroxy-hydrocortisone and esters thereof are highly active without the undesirable sodium retention effect. The new compounds of the present invention when tested by the method of Karnofsky et al., Endocrinology, 48, 596 (1951), are several times as active as 16α-hydroxy-hydrocortisone. In the thymus involution test described by R. I. Dorfman, Physiological Reviews, 34, 158 (1954), the present compounds show activity comparable to 9α-fluoro-hydrocortisone acetate without the undesirable electrolyte activity (sodium retention). At higher dosage levels the present compounds act as sodium excretors which are useful in the treatment of edemas. The new compounds [in the cotton ball test described by Meier et al., Experientia 6, 469 (1950)] also show anti-inflammatory action which is at least equal to that of cortisone acetate.

The compounds of the present invention can be illustrated by the following general formula:

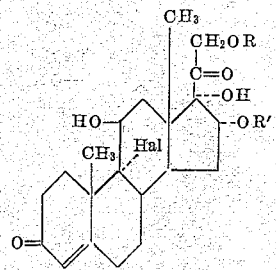

in which R and R' are members of the group consisting of hydrogen and lower alkanoyl radicals and Hal is a halogen radical.

The compounds of the present invention are relatively high melting crystalline solids. They are soluble in the common organic solvents and relatively insoluble in water.

The compounds are prepared from Δ⁴-pregnenes such as diesters of Δ⁴-pregnene-16α,17α,21-triole-3,20-dione-9β,11β-oxide which are described and claimed in our copending application Serial No. 519,248, filed June 30, 1955. When these intermediates are reacted with a hydrogenhalide the 9β,11β-oxide ring is ruptured to form halogenohydrins, the compounds of the present invention. The reaction is generally carried out in a solvent such as chloroform, carbon tetrachloride and the like. The temperature range during the course of the reaction is maintained at from about $-10°$ C. to $15°$ C. Following completion of the reaction, which can range from 30 minutes to several hours, the reaction mixture is usually poured into ice water and neutralized with mild alkali. The desired product is then extracted with a solvent, for example chloroform. On evaporation of the solvent, the crude product is obtained which can be purified by conventional methods. Following completion of the reaction, the reaction mixture can be evaporated to dryness directly and product purified by recrystallization or other well-known methods.

The 9α-fluoro-16α-hydroxy-hydrocortisone of the present invention is very active physiologically. Its activity reaches, and in many instances exceeds, that of cortisone or hydrocortisone without the undesirable side effects of the latter. It can be used both internally for systemic effect and topically for local effect, e. g., in such conditions as rheumatoid arthritis and atopic dermatitis. The compound can be used, therefore, in the form of capsules, pills, tablets, solutions for injection, ointments, salves, and the like.

The following examples describe in detail the preparation of 9α-halo-16α-hydroxy-hydrocortisone and derivatives thereof.

Example 1

A solution of 0.70 g. of $\Delta^{4,9(11)16}$-pregnatriene-21-ol-3,20-dione 21-acetate and 0.50 g. of osmium tetroxide in 10 ml. of benzene and 0.5 ml. of pyridine was allowed to stand at room temperature for 18 hours. The osmate ester was decomposed by the addition of 35 ml. of water, 10 ml. of benzene, 23 ml. of methanol and 3.58 g. each of sodium sulfite and potassium bicarbonate. After stirring the mixture for 5 hours, approximately 150 ml. of chloroform was added and the stirring continued for ½ hour. The mixture was filtered through diatomaceous earth, the residue washed with hot chloroform and the organic layer separated. The aqueous phase was extracted several times with chloroform and the combined extracts were washed with saturated saline and with water. The dried extract was evaporated under reduced pressure and the residue crystallized from acetone-petroleum ether to give 0.62 g. of crude product, melting point 172–174° with previous softening. Three recrystallizations from acetone-petroleum ether gave 0.42 g. of pure $\Delta^{4,9(11)}$-pregnadiene-16α,17α,21-triol-3,20-dione 21-acetate, melting point 195–197.5° with previous softening. One additional recrystallization did not alter the melting point; $\lambda_{max}$. abs. alc. 238.5 mµ (ε16,700); $[\alpha]_D^{25}$+93° (chloroform).

To a solution of 325 mg. of $\Delta^{4,9(11)}$-pregnadiene-16α,17α,21-triol-3,20-dione 21-acetate in 20 ml. of pyridine was added 2 ml. of acetic anhydride, and the mixture was allowed to stand at room temperature for 3 days. The solution was poured into water, cooled and the product was filtered and washed with water to give 0.33 g. of pure $\Delta^{4,9(11)}$-pregnadiene-16α,17α,21-triol-3,20-dione 16α,21-diacetate, melting point 193–195° with previous softening. Two crystallizations from acetone-petroleum ether gave 0.28 g. of pure diacetate, melting point 194–195° with previous softening; $\lambda_{max}$. abs. alc. 238–239 mµ (ε17,400); $[\alpha]_D^{25}$+43° (chloroform).

The diene diacetate, $\Delta^{4,9(11)}$-pregnadiene-16α,17α,21-triol-3,20-dione 16α,21-diacetate (0.50 g.), in dioxane (20 ml.) and water (4 ml.) was treated with N-bromoacetamide (0.31 g.) and 10% perchloric acid (2 ml.). After allowing to stand for 15 minutes at 20°, excess sodium sulfite and water were added. The resultant soft solid was extracted with chloroform and the extract washed with saturated saline, dried, filtered through diatomaceous earth and evaporated under reduced pressure to an oil. Crystallization from acetone-petroleum ether gave 0.45 g.

of crude bromohydrin, melting point 130–133.5° dec., with previous browning. Three crystallizations from acetone-petroleum ether gave 0.31 g. of Δ⁴-pregnene-9α-bromo-11β,16α,17α,21-tetrol-3,20-dione 16α,21-diacetate, melting point 125–126° dec. with previous browning, λmax. abs. alc. 243 mμ (ε14,100); [α]$_D^{25}$+76° (chloroform).

*Example 2*

A solution of 14.5 g. of Δ⁴-pregnene-9α-bromo-11β,16α,17α,21-tetrol-3,20-dione 16α,21-diacetate and 3.2 g. of anhydrous potassium acetate in 1 l. of absolute alcohol was refluxed for 18.5 hours. The reaction mixture was evaporated to dryness and the residue dissolved in ethyl acetate and water. The aqueous phase was extracted with ethyl acetate and the combined extracts were washed with saturated sodium bicarbonate solution and saline. The dried extract was evaporated and the residue was dissolved in 35 ml. of pyridine, treated with 10 ml. of acetic anhydride and allowed to stand at room temperature overnight. Methanol and benzene were added and the solution was evaporated to dryness. Crystallization of the residue from methanol gave 6.5 g. of crude oxide diacetate, melting point 171.5–191.5° with previous softening, suitable for use in further transformations.

A solution of 360 mg. of the oxide diacetate, Δ⁴-pregnene-16α,17α,21-triol-3,20-dione-9β,11β-oxide 16α,21-diacetate in 25 ml. of chloroform (alcohol free) was treated with approximately 1 ml. of anhydrous hydrogen fluoride and allowed to stand at about −10° for 2 hours. The reaction mixture was then poured into ice water, neutralized with saturated sodium bicarbonate solution and extracted several times with chloroform. The washed and dried extract was evaporated to dryness and the residue was dissolved in 5 ml. of pyridine, treated with 2.5 ml. of acetic anhydride and allowed to stand at room temperature overnight. Methanol and benzene were added, and the solution was evaporated to dryness. The residue was crystallized from acetone-petroleum ether to give 146 mg. of crude fluorohydrin. Recrystallization from acetone-petroleum ether gave 123 mg., melting point 231.5–235.5° (Kofler hot stage). A 62 mg. portion of the latter was recrystallized from acetone-petroleum ether to give 59 mg. of Δ⁴-pregnene-9α-fluoro-11β,16α,17α,21-tetrol-3,20-dione 16α,21-diacetate, melting point 230.5–234.5° (Kofler hot stage), 231.5–237.5° (capillary). The long colorless needles as obtained were solvated. The analytical sample when dried for 16 hours over refluxing xylene melted at 237–239° with previous softening (capillary), and there was a 10% loss in weight; λmax. abs. alc. 237.5–238.5 mμ (ε17,600; [α]$_D^{24}$+70° (chloroform).

*Example 3*

Dry nitrogen was bubbled for 15 minutes through a solution of 150 mg. of Δ⁴-pregnene-9α-fluoro-11β,16α,17α,21-tetrol-3,20-dione 16α,21-diacetate and through 10 ml. of methanol containing 14 mg. of sodium. The sodium methoxide solution was then introduced to the steroid solution and allowed to remain at room temperature for 10 minutes under nitrogen. After the addition of 0.05 ml. of glacial acetic acid, the reaction mixture was evaporated to dryness under reduced pressure. Water was added to the residue and the crude product was filtered and washed with water to afford 85 mg., melting point 238–244°, with previous softening and browning. Two crystallizations from acetone-petroleum ether gave 60 mg. of the pure Δ⁴-pregnene-9α-fluoro-11β,16α,17α,21-tetrol-3,20-dione, melting point 257–260°, with decomposition and previous softening and browning; λmax. abs. alc. 238.5 mμ (ε16,300); [α]$_D^{24}$+90° (pyridine).

*Example 4*

To a solution of 100 mg. of Δ⁴-pregnene-16α,17α,21-triol-3,20-dione-9β,11β-oxide 16α,21-diacetate in 2 ml. of chloroform (alcohol free) was added 10 ml. of chloroform saturated with hydrogen chloride. After allowing to stand at 0° for 4.5 hours, the solution was evaporated to dryness. The resultant solid, after treating with activated charcoal, was crystallized from acetone-petroleum ether to give 99 mg. of the chlorohydrin, melting point 211.5–213.5°. Three crystallizations from acetone-petroleum ether gave 80 mg. of pure Δ⁴-pregnene-9α-chloro-11β,16α,17α,21-tetrol-3,20-dione 16α,21-diacetate, melting point 214.5–215.5° (dependent upon the rate of heating and when inserted in the bath; λmax. abs. alc. 240.5 mμ (ε15,800); [α]$_D^{25}$+76° (chloroform).

*Example 5*

A solution of 144 mg. of the chlorohydrin, Δ⁴-pregnene-9α-chloro-11β,16α,17α,21-tetrol-3,20-dione 16α,21-diacetate in 10 ml. of dry methanol was treated with 5 ml. of methanol containing 14 mg. of sodium. Dry nitrogen was bubbled through both solutions for 5 minutes before the addition of the sodium methoxide. The reaction was allowed to proceed at room temperature for 10 minutes, and then neutralized with 0.05 ml. of glacial acetic acid. By concentrating the reaction mixture to about 10 ml., 46 mg. of crystalline material which did not melt at 300° was obtained. The addition of water to the mother liquor afforded a small amount of solid. Since the recovery was poor, both solid and mother liquor were combined and after adding saturated saline solution to the mixture, extraction was attempted with ethyl acetate, ether, benzene, chloroform and methylene chloride. All of the solvents tried proved unsuitable. The organic extracts were separated and the aqueous phase was filtered to afford 50 mg. of solid which was added to the combined extracts. After evaporation, the residue was dissolved in a large amount of boiling acetone (a small amount of material which was also insoluble in water was removed by filtration). Concentration of the acetone gave 37 mg. of Δ⁴-pregnene-9α-chloro-11β,16α,17α,21-tetrol-3,20-dione; material darkens but does not melt at 360°, positive Beilstein and Blue Tetrazolium tests. Crystallization from methanol gave 24 mg. of product, begins to darken at 190° but does not melt at 400° (due to the unusually high melting point, further recrystallization was not attempted; λmax. abs. alc. 240–240.5 mμ (ε15,900).

We claim:

1. A compound selected from those having the general formula:

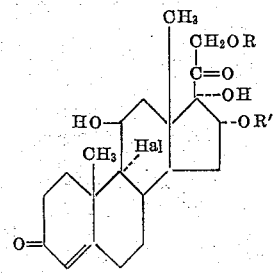

in which R and R′ are members of the group consisting of hydrogen and lower alkanoyl radicals and Hal is a halogen radical.

2. The compound Δ⁴-pregnene-9α-fluoro-11β,16α,17α,-21-tetrol-3,20-dione.

3. The compound Δ⁴-pregnene-9α-chloro-11β,16α,17α,-21-tetrol-3,20-dione.

4. The compound Δ⁴-pregnene-9α-fluoro-11β-16α,17α,-21-tetrol-3,20-dione 16α,21-diacetate.

5. The compound Δ⁴-pregnene-9α-chloro-11β,16α,17α,-21-tetrol-3,20-dione 16α,21-diacetate.

6. The compound Δ⁴-pregnene-9α-bromo-11β,16α,17α,-21-tetrol-3,20-dione 16α,21-diacetate.

References Cited in the file of this patent

UNITED STATES PATENTS 2,707,190  Farrar _____ Apr. 26, 1955